(12) United States Patent
Butsuen et al.

(10) Patent No.: US 8,671,787 B2
(45) Date of Patent: Mar. 18, 2014

(54) DRIVE DEVICE

(75) Inventors: Tsukasa Butsuen, Higashihiroshima (JP); Bernhard Alois Meier, Kirchheim (DE)

(73) Assignee: Webasto AG, Stockdorf (DE)

( * ) Notice: Subject to any disclaimer, the term of this patent is extended or adjusted under 35 U.S.C. 154(b) by 359 days.

(21) Appl. No.: 12/526,193

(22) PCT Filed: Nov. 16, 2007

(86) PCT No.: PCT/JP2007/072274
§ 371 (c)(1),
(2), (4) Date: Feb. 7, 2011

(87) PCT Pub. No.: WO2008/059956
PCT Pub. Date: May 22, 2008

(65) Prior Publication Data
US 2011/0174092 A1 Jul. 21, 2011

(30) Foreign Application Priority Data

Nov. 17, 2006 (JP) .................................. 2006-311354

(51) Int. Cl.
*F16H 19/08* (2006.01)
(52) U.S. Cl.
USPC ............................................................ 74/25

(58) Field of Classification Search
USPC ............ 74/25, 33, 82; 49/348, 349, 352, 414; 296/223
See application file for complete search history.

(56) References Cited

U.S. PATENT DOCUMENTS 4,420,185 A * 12/1983 Bienert et al. ................ 296/223

FOREIGN PATENT DOCUMENTS

| JP | 2023216 U | 2/1990 |
| JP | 2006-168531 | 6/2006 |

OTHER PUBLICATIONS

International Search Report dated Dec. 18, 2007.

* cited by examiner

*Primary Examiner* — Vicky Johnson
(74) *Attorney, Agent, or Firm* — Fitch Even Tabin & Flannery LLP

(57) ABSTRACT

An output shaft, to which the rotational force of a motor is transmitted, is rotatably supported and housed in a case. One end of the output shaft protrudes from the case, and a pinion gear is provided on this one end. Teeth that mesh with the pinion gear are provided on the outer circumferential surface of cables. A guide member for guiding the cables in such a way that they mesh with the pinion gear is mounted on the case. An urging plate portion that presses against the side of the pinion gear is provided on the guide member. The urging plate portion urges the output shaft in the axial direction and, as a result, rattle of the output shaft is alleviated.

6 Claims, 5 Drawing Sheets

DRIVE DEVICE

CROSS-REFERENCE TO RELATED APPLICATIONS

This application is a U.S. national phase application filed under 35 U.S.C. §371 of International Application No. PCT/JP2007/072274, filed Nov. 16, 2007, designating the United States, which claims priority from Japanese Patent Application No.: JP 2006-311354, filed Nov. 17, 2006, which are hereby incorporated herein by reference in their entirety for all purposes.

TECHNICAL FIELD

The present invention relates to a drive device for driving an object to be driven with a drive cable by using the rotational force of a motor to move the cables.

BACKGROUND ART

As disclosed in, for example, cited document 1, conventionally known drives devices of this type are configured to drive a roof panel (object to be driven) from which a part of a vehicle sunroof apparatus is constituted by the push-pull operation of a drive cable. The drive device of cited document 1 comprises a case for housing a gear mechanism for decelerating the rotational speed of a motor and an output shaft rotatably supported with respect to the case. One end of the output shaft protrudes from the case. A pinion gear from which part of a driving-side meshing part is constituted is fixed to this end of the output shaft. In addition, teeth from which the driven-side meshing part is constituted and which mesh with the pinion gear are formed in the outer circumferential surface of a cable. The cable is inserted and held in a guide pipe fixed to a plate member on which the drive device is mounted. The cable inserted in the guide pipe is disposed in such a way that the teeth thereof mesh with the pinion gear.

According to the aforementioned drive device, when the rotational force of the motor is translated to the output shaft by way of the gear mechanism and the pinion gear rotates, the cable is moved along the direction of its center line while being guided and caused to slide along a predetermined track within the guide pipe.

Cited Document 1: Japanese Unexamined Patent Application No. 2006-168531

DISCLOSURE OF THE INVENTION

However, because the output shaft of the drive device of cited document 1 is rotatably supported with respect to the case, rattle of the output shaft with respect to the case may occur for reasons that are attributable to the manufacturing tolerance of either or both of the output shaft or the case. Rattle of the output shaft results in the generation of abnormal noise during, for example, the start-up and reverse operations of the motor.

Furthermore, in the structure of the drive device of cited document 1, the teeth of the pinion gear and the teeth of the cable are caused to mesh. There is a concern inherent to the adoption of a structure such as this that when, for example, the cable starts to separate from the pinion gear and the gap therebetween increases, mis-meshing that inhibits the cable from moving smoothly and, in turn, inhibits the roof panel from moving in the manner in which it is designed will occur.

In other words, while the problems associated with the rattle that is generated in the output shaft and the mis-meshing that occurs between the cable and the pinion gear which are inherent to the drive device as described above need to be resolved, from the standpoint of cost, the increase in number of component parts for achieving the resolution to these possible should be limited as far as possible.

With the foregoing conditions in mind, it is an object of the present invention to provide a drive device configured in such a way that a motor is used to move the drive cable which, while achieving a reduction in costs by as far as possible limiting the increase in the number of component parts, alleviates the rattle of the output shaft to prevent the generation of abnormal noise, and prevents mis-meshing between the driven-side meshing part of the cable and the drive-side meshing part of the output shaft to ensure smooth movement of the cable.

The present invention achieves the aforementioned object by the provision of a guide member for guiding the cable that is able to exert an urging force on the output shaft.

More specifically, a first invention of a drive device which includes a drive cable coupled to an object to be driven and a motor, and which is configured in such a way that the aforementioned cable is moved in the direction of its center line by the rotational force of the motor comprises: an output shaft to which the rotational force of the aforementioned motor is transmitted; a case in which the aforementioned output shaft is rotatably supported and housed with one end protruding; a drive-side meshing part provided on the aforementioned one end of the output shaft; a driven-side meshing part provided along a predetermined length of the aforementioned cable; and a guide member for guiding the aforementioned cable in such a way that the aforementioned driven-side meshing part meshes with the aforementioned drive-side meshing part, wherein an urging part for urging the aforementioned output shaft in the axial direction is integrally formed in the aforementioned guide member.

According to this invention, when the rotational force of the motor is transmitted to the output shaft, the drive-side meshing part rotates about the output shaft. The rotational force of the drive-side meshing part is transmitted to the driven-side meshing part of the cable, and the cable is moved along the direction of its center line. Because the cable is guided by the guide member while it is being moved, mis-meshing between the driven-side meshing part of the cable and the drive-side meshing part of the output shaft is prevented. In addition, because the output shaft is urged by the urging force of the urging part provided on a guide member, rattle is alleviated. Because the urging part is integrally formed in the guide member, the increase in the number of component parts is limited.

In a second invention of the drive device according to the first invention, the guide member of the drive device is configured as an integrally molded metal plate.

According to this configuration, a common manufacturing apparatus such as a press can be employed to produce a guide member having an urging part.

In a third invention of the drive device according to the second invention, the urging part of the guide member is formed in the shape of a plate spring and is disposed between the outer surface of the case and the drive-side meshing part.

According to this configuration, the urging part presses against the outer surface of the case and the drive-side meshing part. As a result, both the rattle of the output shaft and also the rattle of the guide member itself are able to be reliably prevented.

According to the first invention, because the urging part for urging the output shaft is integrally molded in the guide member used to guide the cable, the increase in the number of components is limited and a reduction in costs is achieved and, at the same time, the cable is able to be moved smoothly to ensure the object to be driven is driven in the manner in which it is designed, and rattle of the output shaft is able to be alleviated to ensure prevention of the generation of abnormal noise.

According to the second invention, a further reduction in costs is able to be achieved by the use of an integrally molded metal plate able to be produced by employing a common manufacturing apparatus as the guide member.

According to the third invention, because the urging part of the guide member is formed in the shape of a plate spring and is disposed between the outer surface of the case and the drive-side meshing part, rattle of the guide member itself is able to be reliably prevented, and the cable is able to be guided with a high degree of precision.

EXPLANATION OF SYMBOLS

Figure 1:
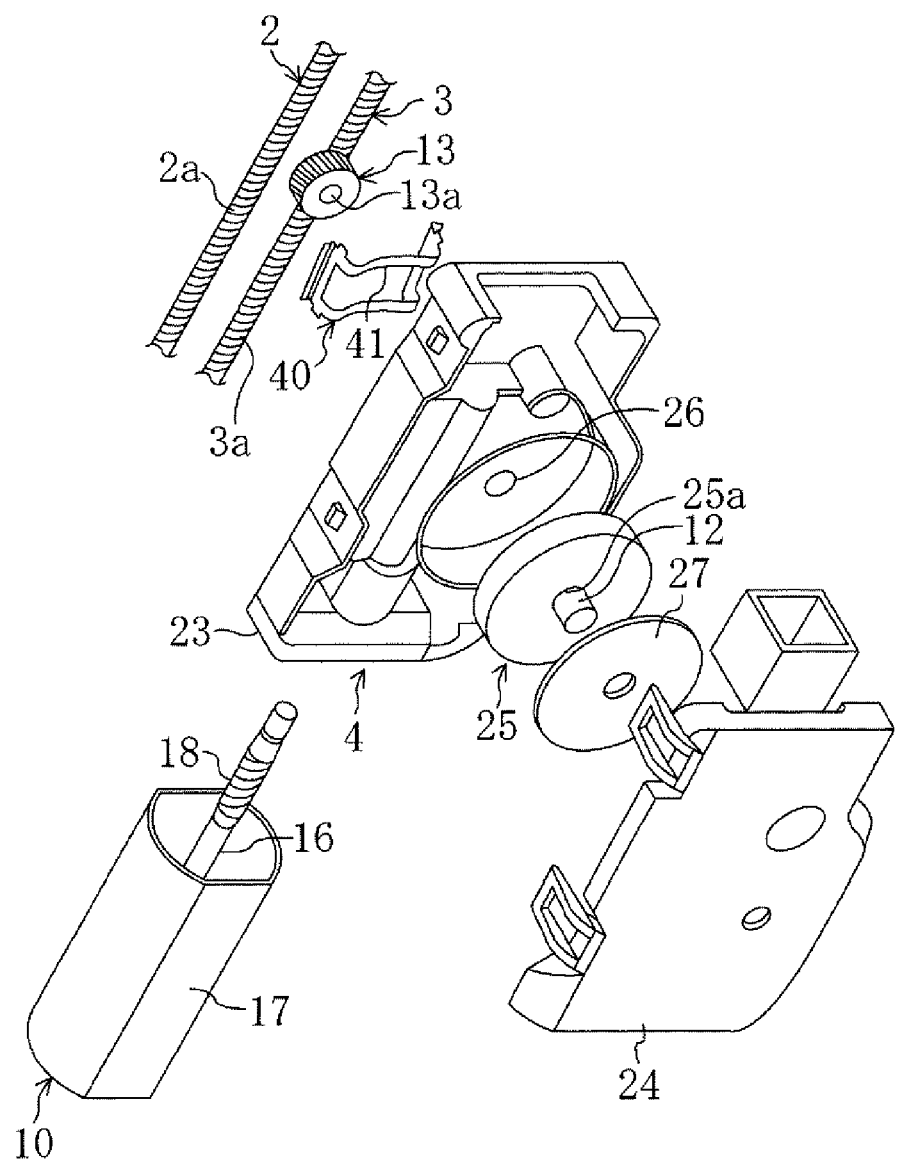
FIG. 1 is an exploded perspective view of an embodiment of the drive device pertaining to the present invention.

1 Drive device
2 First cable
3 Second cable
2a, 3a Teeth (driven-side meshing part)
10 Motor
12 Output shaft
13 Pinion gear (drive-side meshing part)
15 Case
40 Guide member
40a Urging plate portion (urging part)

BEST MODE FOR CARRYING OUT THE INVENTION

An embodiment of the present invention will be hereinafter described in detail with reference to the drawings. Notably, the description of the preferred embodiment that follows is provided essentially for illustrative purposes alone, and the present invention, and the objects on which it has application, should not be regarded as limited thereto.

FIG. 1 is an exploded perspective view of an embodiment of a drive device 1 pertaining to the present invention. The drive device 1 includes first and second cables 2, 3 serving as drive cables, and a drive force generating portion 4 for moving these cables 2, 3 in the direction of their center line. The drive device 1 drives the roof panel (object to be driven) of a vehicle sun roof apparatus (not shown in the diagram), the ends of the first and second cables 2, 3 are mounted on left and right side link members (not shown in the drawing) provided on left and right end portions respectively of the roof panel, and the first and second cables 2, 3 are coupled to the roof panel by way of these link members. As a result of the movement of the first and second cables 2, 3, the roof panel is operated to tilt and slide while tracing a predetermined track.

Figure 2:
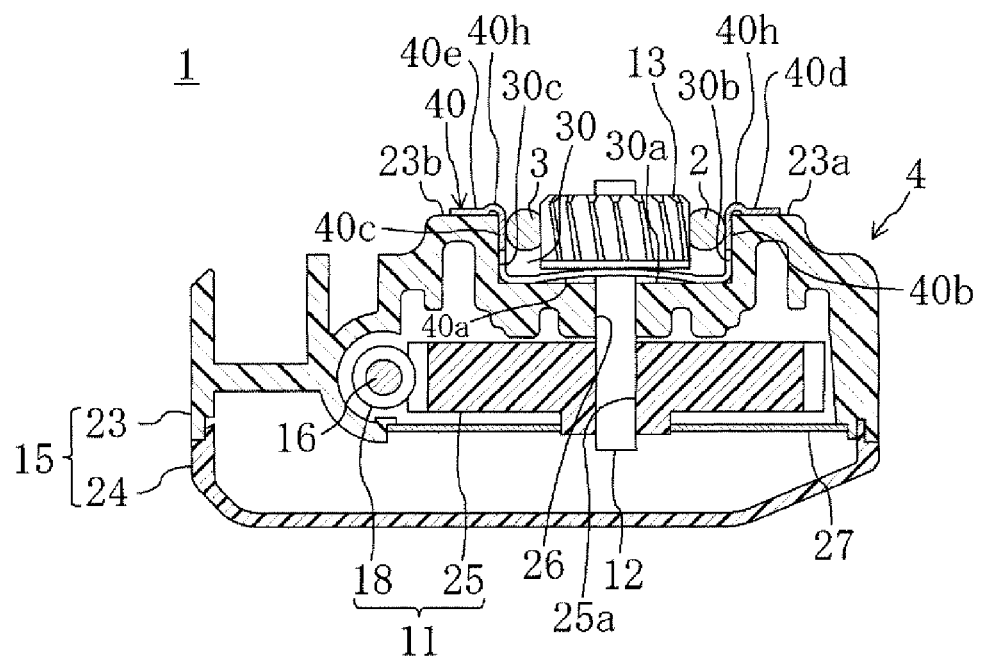
FIG. 2 is a cross-sectional diagram of the drive device.

The drive force generating portion 4 of the aforementioned drive device 1 includes a motor 10, a gear mechanism 11 (as shown in FIG. 2) for decelerating the rotational speed of the motor 10, an output shaft 12 to which the output from the gear mechanism 11 is transmitted, a pinion gear 13 fixed to the output shaft 12, and a case 15 in which the gear mechanism 11 and the output shaft 12 are housed.

The aforementioned motor 10 includes a rotating shaft 16 and a housing 17 provided in the longitudinal direction thereof. The rotating shaft 16 protrudes from one end part in the longitudinal direction of the housing 17. The housing 17 of the motor 10 is integrally fixed to the case 15 and, in this state, the distal end of the rotating shaft 16 is located in the case 15. A worm 18 from which a drive-side gear of the gear mechanism 11 is constituted is provided in the distal end of the rotating shaft 16 in the direction of protrusion thereof. In addition, a circuit board (not shown in the drawing) on which a control circuit for the motor 10 is laid is arranged in the aforementioned case 15, and the stoppage, start-up and forward/reverse rotation switchover of the motor 10 is performed by this control circuit. Notably, the control circuit may be arranged externally of the case 15.

The aforementioned case 15 is constituted by a box-shaped case member 23 formed from a resin material, and a plate-shaped case member 24 formed in such a way as to cover an open portion of the box-shaped case member 23. A worm gear 25 from which the driven-side gear of the gear mechanism 11 is constituted is arranged in the case 15 in such a way as to mesh with the worm 18 of the aforementioned rotating shaft 16. A center hole 25a is formed to pass through a center portion of the worm gear 25. The aforementioned output shaft 12 is fitted into this center hole 25a, and the worm gear 25 and output shaft 12 are integrated in such as way that they do not relatively rotate.

In addition, a through-hole 26 through which one end of the output shaft 12 is inserted is formed in the box-shaped case member 23. A support member 27 for supporting the protruding portion to be able to rotate about the center hole 25a of the worm gear 25 is arranged in the case 15. In other words, the output shaft 12 is supported by the inner circumferential surface of the through-hole 26 and the support member 27 in such a way as to be able to rotate with respect to the case 15. Notably, the worm gear 25 may be directly supported by the case 15 without need for the arrangement of the support member 27. In addition, both ends of the output shaft 12 may be directly supported by the case 15.

One end of the aforementioned output shaft 12 protrudes outward of the case 15 by way of the through-hole 26. This one end of the output shaft 12 is fitted into the center hole formed in the center portion of the aforementioned pinion gear 13, and the pinion gear 13 and output shaft 12 are integrated in such a way that they do not relatively rotate. The pinion gear 13, which constitutes the drive-side meshing part of the present invention, is a so-called helical gear in which, in the side view, the teeth lie diagonal to the center line of the gear 13.

A pinion gear-disposed recessed portion 30 in which the aforementioned pinion gear 13 is disposed is formed in the outer surface of the aforementioned box-shaped case member 23 in a position corresponding to the through-hole 26. The inner circumferential surface of the aforementioned pinion gear-disposed recessed portion 30 is constituted by a flat face portion 30a that extends in a direction orthogonal to the center line of the pinion gear 13, and first and second upright face portions 30b, 30c that rise up from the two edge portions of the flat face portion 30a and extend in the direction of the center line of the pinion gear 13. The aforementioned through-hole 26 opens to the aforementioned flat face portion 30a. Furthermore, a first distal end face portion 23a that extends from the distal end edge of the upright face portion 30b in a direction away from the pinion gear 13, and a second distal end face portion 23b that extends from the distal end edge of the upright face portion 30c in a direction away from the pinion gear 13 are formed in the outer surface of the box-shaped case member 23.

The aforementioned first and second cables 2, 3 are toothed cables that are normally used in a common sun roof apparatus. Teeth 2a, 3a (as shown in FIG. 1) are formed continuously along a predetermined length in the center portion in the longitudinal direction of the cables 2, 3 excluding the two end portions thereof. The shape of the teeth 2a, 3a is such that they mesh with the pinion gear 13. The teeth 2a, 3a of the first and second cables 2, 3 constitute the driven-side meshing part of the present invention.

The center portion in the longitudinal direction of the aforementioned first cable 2 is disposed between the pinion gear 13 and the upright face portion 30b, and extends essentially linearly along the flat face portion 30a. In addition, the center portion in the longitudinal direction of the second cable 3 is disposed between the pinion gear 13 and the second upright face portion 30c and extends essentially along the flat face portion 30a. In other words, the center portion of the first and second cables 2, 3 is disposed to sandwich the pinion gear 13 in its diametric direction, and to extend essentially in parallel.

As shown in FIG. 2, a guide member 40 for guiding the teeth 2a, 3a of the aforementioned first and second cables 2, 3 in such a way as to mesh with the pinion gear 13 is disposed in the aforementioned pinion gear-disposed recessed portion 30. This guide member 40 constitutes an integrally molded resilient metal plate such as a steel plate formed by press molding formed with an overall U-shape cross-section that corresponds to the inner-surface shape of the pinion gear-disposed recessed portion 30.

Figure 3:
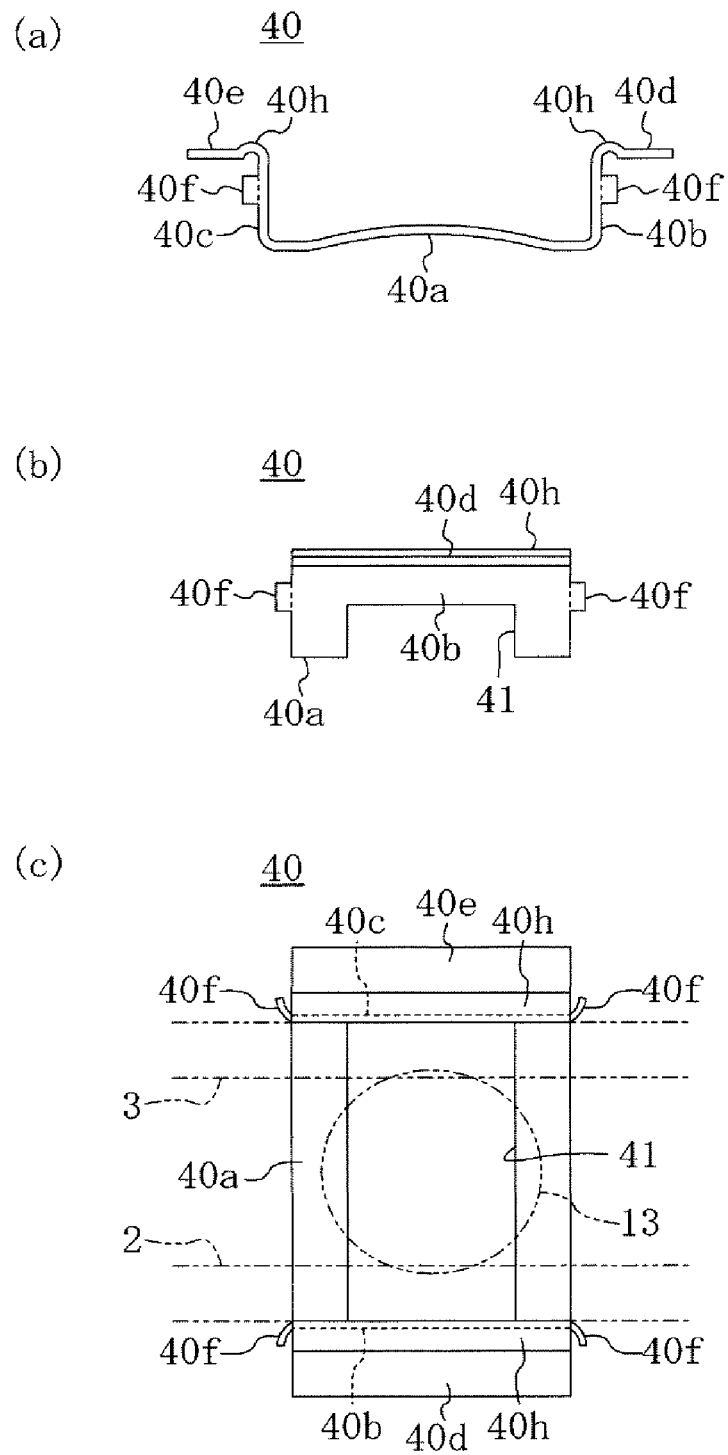
FIG. 3 is a diagram of the guide member in which (a) is a front view, (b) is a side view and (c) is a plan view thereof.

As also shown in FIG. 3, the aforementioned guide member 40 comprises an urging plate portion 40a serving as an urging part disposed between the side of the output shaft 12 and the flat face portion 30a of the case 15, first and second side plate portions 40b, 40c that extend along the first upright face portion 30b and the second upright face portion 30c from the two edges of the urging plate portion 40a, and first and second distal end plate portions 40d, 40e that extend from the distal end edges of the first and second side plate portions 40b, 40c along the first and second distal end face portions 23a, 23b. As also shown in FIG. 2, an open portion 41 that opens from the first vertical plate portion 40b along the urging plate portion 40a and the second upright plate portion 40c is formed in the guide member 40, and one end of the output shaft 12 is inserted into the open portion 41. The aforementioned first side plate portion 40b constitutes a guide portion that contacts the first cable 2 at an opposing side to the pinion gear 13, and that guides the first cable 2 in such a way as to mesh with the pinion gear 13. Similarly to the first side plate portion 40b, the second side plate portion 40c constitutes a guide portion that guides the second cable 3 to mesh with the pinion gear 13.

Guide pieces 40f are arranged to protrude from both side edges of the aforementioned first side plate portion 40b and both side edges of the aforementioned second side plate portion 40c. As shown in FIG. 3(c), the two guide pieces 40f of the first side plate portion 40b are formed to separate from the outer circumferential surface of the first cable 2 from the proximal end portion to the distal end thereof, and the first cable 2 is smoothly guided between the first side plate portion 40b and the pinion gear 13 by these guide pieces 40f. The guide pieces 40f of the second side plate portion 40c are similarly designed to smoothly guide the second cable 3.

Ridge portions 40h, 40h are provided in the aforementioned first and second distal end plate portions 40d, 40e in the boundary region thereof with the first and second side plate portions 40b, 40c. These ridges 40h, 40h extend in the same direction as the direction in which the first and second cables 2, 3 extend.

As shown in FIG. 2, when the urging plate portion 40a is disposed within the pinion gear-disposed recessed portion 30, it is formed in the shape of a plate spring that is bent toward the pinion gear 13 side. While this bent apex portion and the portion in proximity thereof press against the side of the pinion gear 13, the sections thereof in proximity of the first side plate portion 40b and in proximity of the second side plate portion 40c in the urging plate portion 40a press against the flat face portion 30a of the box-shaped case member 23. In addition, the gap between the aforementioned first and second side plate portions 40b, 40c is formed larger than the gap between the first and second upright face portions surface parts 30b, 30c of the box-shaped case member 23. In addition, the first and second distal end plate portions 40d, 40e abut the first and second distal end face portions 23a, 23b of the box-shaped case member 23.

The gist of the assembly of the aforementioned guide member 40 will be hereinafter described. The guide member 40 is assembled in the case 15 prior to the pinion gear 13 being assembled in the output shaft 12. When the guide member 40 is inserted into the pinion gear-disposed recessed portion 30 it is elastically deformed in such a way that the first and second side plate portions 40b, 40c narrow, and in such a way that a state in which the two side plate portions 40b, 40c press against the first and second driven side parts 30b, 30c of the case 15 is established. This prevents rattle of the guide member 40. When the first and second distal end plate portions 40d, 40e of the guide member 40 abut the first and second distal end face portions 23a, 23b of the box-shaped case member 23, the direction of insertion of the guide member 40 is positionally determined. At this time, the urging plate portion 40a abuts the flat face portion 30a. When the pinion gear 13 is mounted on the output shaft 12, a state in which the urging plate portion 40a is sandwiched between the pinion gear 13 and the flat face portion 30a is established. This ensures an urging force is constantly exerted on the output shaft 12 in the direction of its center line by the urging plate portion 40a, and alleviates rattle of the output shaft 12. In addition, rattle of the guide member 40 itself is able to be reliably prevented as a result of the urging plate portion 40a pressing on the side of the pinion gear 13 and the outer surface of the case 15 in this way.

The operation of the drive device 1 configured in the manner described above will be hereinafter described. When a voltage is applied to the motor 10 and the rotating shaft 16 rotates, the worm 18 rotates and a rotational force is transmitted to the worm gear 25. The rotation of the worm gear caused the output shaft 12 to rotate and the pinion gear 13 to rotate. The prevention of rattle of the output shaft 12 by the urging plate portion 40a alleviates the generation of abnormal noise during start-up. In addition, because the metal urging plate portion 40a is positioned between the pinion gear 13 and the outer surface of the case 15, there is no slide contact between the pinion gear 13 with the outer surface of the case 15 caused by the rotation of the pinion gear 13 and, accordingly, wear of the case 15 is prevented.

When the aforementioned pinion gear 13 rotates, because the teeth 2a, 3a of the first and second cables 2, 3 mesh with the pinion gear 13, the two cables 2, 3 move synchronously in the direction of their center lines. At this time, because the first and second cables 2, 3 are guided by the first and second side plate portions 40*b*, 40*c* in such a way as to mesh with the pinion gear 13, mis-meshing can be prevented and the cables 2, 3 can be smoothly moved. Slide contact occurs between the moving cables 2, 3 and the metal guide member 40 and, accordingly, wear of the case 15 can be prevented.

According to the drive device 1 pertaining to the embodiment described above, because the urging plate portion 40*a* for urging the output shaft 12 is integrally molded in the guide member 40 for guiding the first and second cables 2, 3, the increase in the number of components parts is limited and a reduction in costs is able to be achieved and, at the same time, the cables 2, 3 can be smoothly moved to ensure the roof panel can be driven in the manner in which it is designed, and rattle of the output shaft 12 is able to be alleviated to ensure the prevention of the generation of abnormal noise.

In addition, an even greater reduction in costs can be achieved as a result of a metal plate integrated molded article being able to be used as the guide member 40, and as a result of this guide member 40 being able to be produced employing a press.

In addition, because the urging plate portion 40*a* of the guide member 40 formed in the shape of a plate spring is arranged between the outer surface of the case 15 and the pinion gear 13, rattle of the guide member 40 itself can be reliably prevented, and the first and second cables 2, 3 can be guided with high precision.

Figure 4:
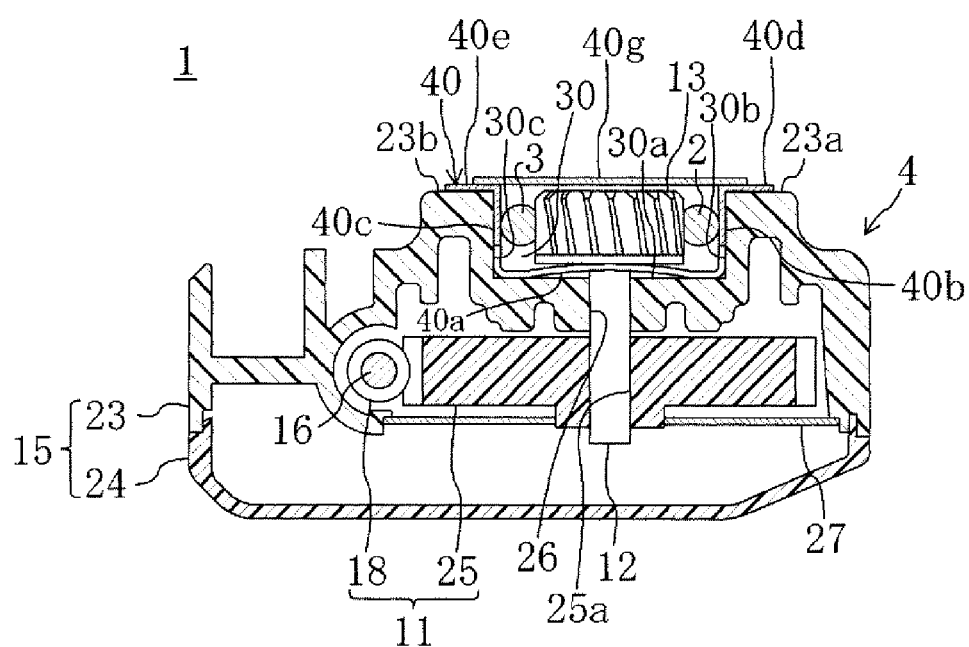
FIG. 4 is a diagram equivalent to FIG. 2 of a modified example of the embodiment.
Figure 5:
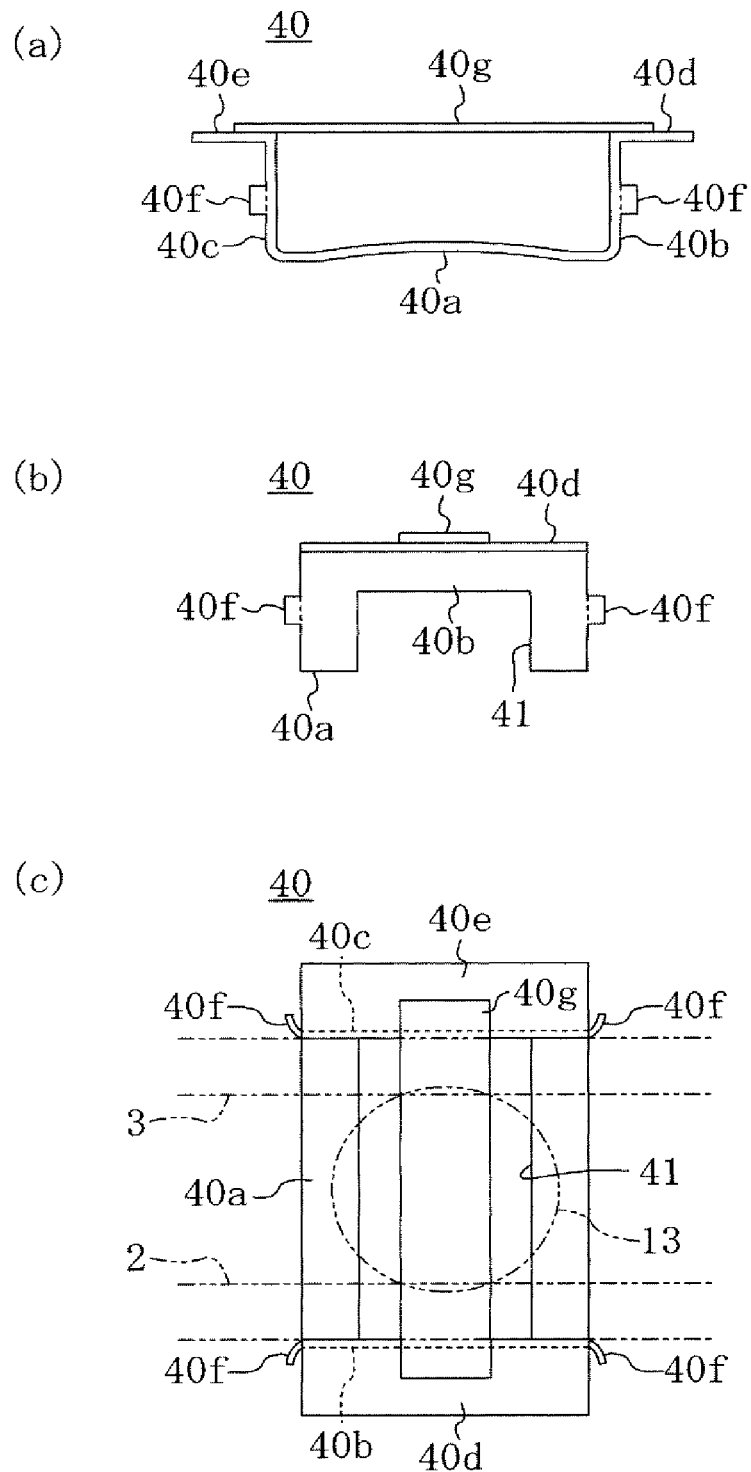
FIG. 5 is a diagram equivalent to FIG. 3 of the modified example of the embodiment.

In addition, as shown by the modified example of FIG. 4 and FIG. 5, the guide member 40 may be a closed cross-sectional shape in which the first distal end plate portion 40*d* and the second distal end plate portion guide member 40*e* of the guide member 40 are coupled. That is to say, a coupling plate portion 40*g* that extends from the first distal end plate portion 40*d* to the second distal end plate portion 40*e* is provided on the guide member 40 in a bridge shape to span the two distal end plate portions 40*d*, 40*e*, and the two ends of the coupling plate portion 40*g* are fixed to the first distal end plate portion 40*d* and the second distal end plate portion 40*e*. The provision of this coupling plate portion 40*g* renders the deformation that causes the first side plate portion 40*b* and the second side plate portion 40*c* to separate unlikely, and affords an overall improvement in the rigidity of the guide member 40. As a result, the first and second cables 2, 3 are able to be guided with good precision.

Notably, while the aforementioned embodiment describes the provision of two cables 2, 3 in the drive device 1, this configuration is not limited thereto and a single cable may be provided.

Furthermore, while the aforementioned embodiment describes the application of the present invention in a sun roof apparatus A, the present invention may have application to drive objects to be driven which are driven by the push-pull operation of the cables 2, 3 apart from the sun roof apparatus A. Examples of such objects to be driven include the windows of automobiles, sliding doors, and roofs configured to be openable.

INDUSTRIAL APPLICABILITY

As is described above, the present invention has application as a drive device for driving, for example, the roof panel of a vehicle sun roof apparatus.

The invention claimed is:

1. A drive device for driving an object to be driven with a drive cable by using the rotational force of a motor to move the cable, the drive device comprising:
   an output shaft to which the rotational force of said motor is transmitted;
   a case in which said output shaft is rotatably supported and housed with one end protruding and;
   a drive-side meshing part provided on said one end of the output shaft;
   a driven-side meshing part provided along a predetermined length of said cable; and
   a guide member for guiding said cable in such a way that said driven-side meshing part meshes with said aforementioned drive-side meshing part,
   wherein an urging part for urging said output shaft in the axial direction is integrally formed in said guide member; and
   wherein the urging part of the guide member is formed in the shape of a plate spring and is disposed between the outer surface of the case and the drive-side meshing part.

2. The drive device of claim 1, wherein the guide member is an integrally molded metal plate.

3. The drive device of claim 1, wherein the urging part of the guide member urges the drive side meshing part provided on one end of the output shaft in an axial direction away from the case.

4. The drive device of claim 1, wherein the urging part of the guide member urges the drive side meshing part provided on one end of the output shaft in an axial direction outwardly from the motor.

5. The drive device of claim 1, wherein the urging part of the guide member is at least in part disposed on the outer surface of the case.

6. The drive device of claim 1, wherein a gap separating a flat bottom portion of the drive-side meshing part and the outer surface of the case includes only the urging part of the guide member.

* * * * *